UNITED STATES PATENT OFFICE.

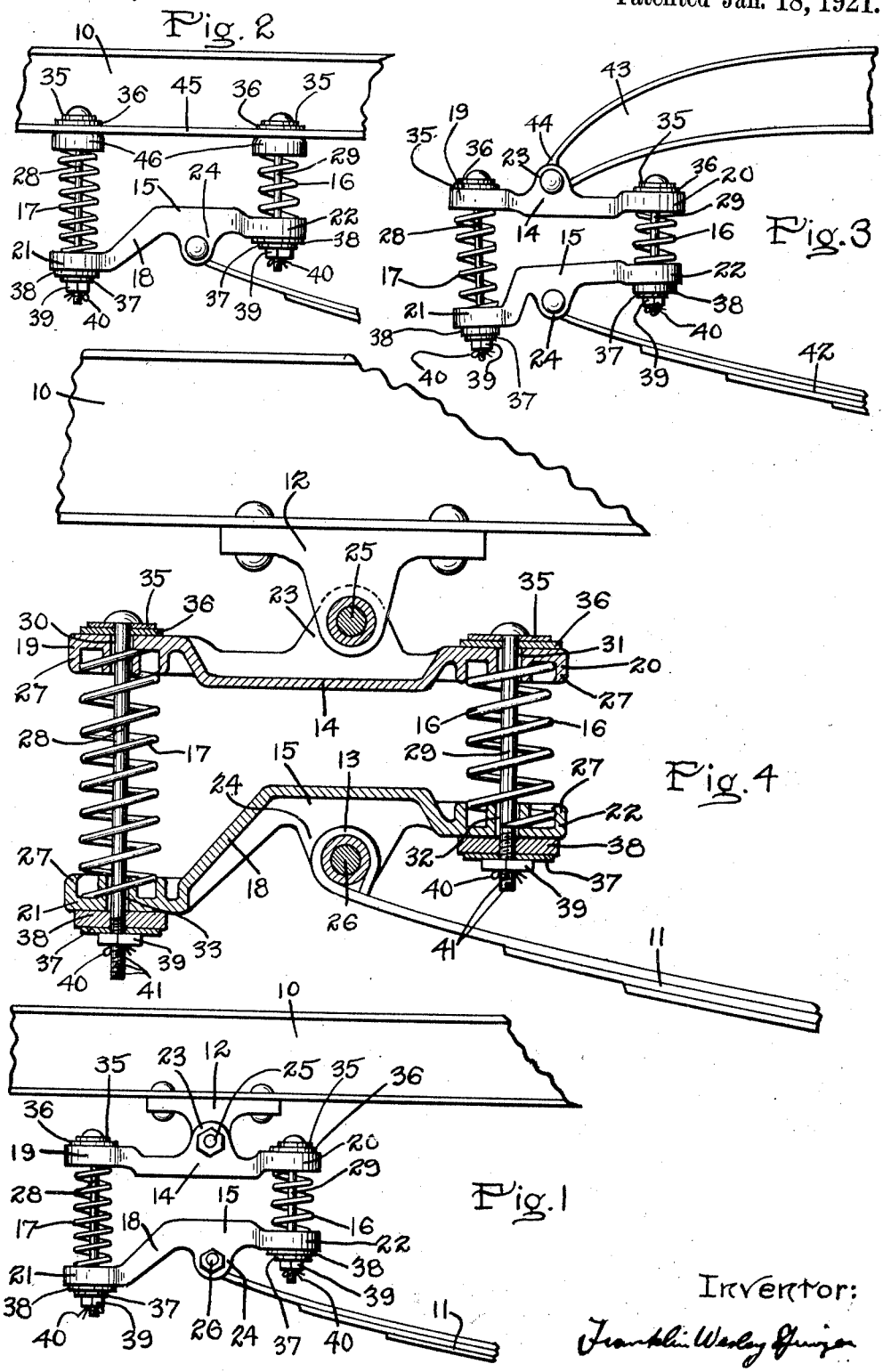

FRANKLIN WESLEY SPRINGER, OF MINNEAPOLIS, MINNESOTA.

SHOCK-ABSORBER FOR VEHICLES.

1,366,033.  Specification of Letters Patent.  Patented Jan. 18, 1921.

Application filed August 31, 1917. Serial No. 189,119.

*To all whom it may concern:*

Be it known that I, FRANKLIN WESLEY SPRINGER, a citizen of the United States, residing at Minneapolis, in the State of Minnesota, county of Hennepin, have invented a new and useful Improvement in Shock-Absorbers for Vehicles, of which the following is a specification.

My invention relates to shock absorbers for motor vehicles and has for its object to provide a tandem lever device constructed with a pair of interposed spring members, adapted to be positioned between the existing spring and spring support of the vehicle. A still further object is to provide means for adjusting the initial tension in the springs and for taking up the play in the devices limiting the rebound movement of the same.

The full objects and advantages will appear in the detailed description of my invention and are particularly pointed out in the claims.

In the drawings illustrating my invention in one form: Figure 1 is a side elevational view of a portion of the frame and spring of a motor vehicle with my invention applied to the existing parts of the same. Fig. 2 is a view similar to Fig. 1, showing the method of attaching the device to a vehicle designed to be equipped with shock absorbers at the factory. Fig. 3 is another view similar to Fig. 1 showing a slightly different form of the device applied to a different form of vehicle. Fig. 4 is a sectional detail view of the shock absorber shown in Fig. 1, drawn to a larger scale.

In Fig. 1, a vehicle frame member 10 is shown in conjunction with a leaf spring 11.
In ordinary construction a perch or support 12 is riveted to the lower flange of frame member 10 which perch is connected to the looped end 13 of spring 11 by a shackle not shown in the drawings. My invention comprises a pair of supports 14 and 15, which replace the aforesaid shackle, and which serve as seats for a pair of compression coil springs 16 and 17 interposed between the same on opposite sides of the points of pivot thereof.

These members as will be perceived are longitudinally situated with respect to the spring 11 and extend on one side between the spring 11 and frame 10. These members terminate in seats 19, 20, 21 and 22 in which the respective springs 17 and 16 are seated.

In order to render the device more stable and to reduce lateral swaying, one of the springs 16 and 17 is preferably formed short and stiff. Inasmuch as the space between spring 11 and frame 10 is quite limited spring 16 may be so constructed. When spring 17 is made longer than spring 16 the member 15 is bent downward at 18 to make provision for the additional length. In operation it is preferable to have the member 15 approach member 14 in a substantially paralleled relation. This may be accomplished by properly choosing lever arms for the set of springs which will divide the applied force to give approximately the same amount of movement to each spring. The rigidity and length of springs and the lever arms for the same may of course be varied as desired to fit the design of the vehicle to which the device is to be applied and to give the results desired.

The details of construction of the shock absorber can best be seen in Fig. 4. Members 14 and 15 are preferably formed U shaped in cross section and between the spring seats 19, 20, 21 and 22 are provided with ears 23 and 24, through which pass bolts 25 and 26 by means of which said members are pivoted to the perch 12 and spring portion 13. The spring seats 19, 20, 21 and 22 are formed cup shaped as is clearly shown with lips 27 which may be bent over to embrace the ends of springs 16 and 17 to firmly hold them in place. Although cylindrical coil springs have been shown, any form of compression spring may be used which can be attached to the supports in any desirable manner.

To limit the movement of the members 14 and 15 of the shock absorber I employ two bolts 28 and 29 passing loosely through apertures 30, 31, 32 and 33 in the centers of the respective springs seats 19, 20, 21 and 22 and through the centers of the coil springs 16 and 17. Between the heads of these bolts and the top of member 14 are preferably placed first a steel washer 35 and then a leather washer 36. This permits of oscillatory movement of members 14 and 15 without undue wear of the bolts at the joints. Similarly at the other ends of the bolts a steel washer 37 and a soft rubber washer 38 may be employed which serve the same purpose besides acting as a buffer when the springs 16 and 17 are stretched the maximum amount. Nuts 39 screwable upon the ends of bolts 28 and 29 hold the parts correctly spaced and are held from unscrewing by cotter pins 40 which may be inserted in a number of holes 41 in the ends of said bolts.

In operation the amount of space between the member 15 and the washers 38 is determined by experiment. Usually no play is left when the vehicle is left in its normal position. This has the effect of retarding the movement of the shock absorber members in one direction, thus serving as a buffer, which greatly increases the effectiveness of the device.

In Fig. 3, the device is shown attached to the rear end of a bent frame member 43 and to a rear semi-elliptic spring 42 designed to have a wide range of movement. In this case the member 14 is pivoted directly to the rear end 44 of frame member 43, and the perch 12 dispensed with. Due to the relative closeness of the spring 42 to the frame 43 when said spring is bent its maximum amount, spring 16 is made somewhat short and is positioned more remotely from the points of attachment of members 14 and 15 to the vehicle. Spring 17 can, if desired, be brought up closer to said points of attachment as is clearly shown.

In this form of my invention the members 14 and 15 do not move parallel, but approximate a parallel position as these members approach each other. This form of the invention may be used with any of the other forms of vehicles the relative dimensions and proportioning of parts being a matter of design or choice to give the best results for the particular vehicle to which the shock absorber is to be attached.

When the device is to be equipped with the shock absorbers at the factory, member 14 need not be employed. The device is then constructed as shown in Fig. 2. Bolts 28 and 29 pass directly through the lower flange 45 of frame member 10 and are provided with cups 46, which take the place of the seats 19 and 20 provided on member 14.

The advantages of my invention are manifest. The device is simple in construction and cheap to manufacture. All of the wearing parts can be quickly and readily replaced and the washers 36 and 38 can be easily constructed by a novice when worn out, without requiring shipment from the factory.

I claim:

1. In combination with the frame and body spring of a vehicle, a shock absorber comprising a member pivoted to said body spring and positioned between said body spring and the frame in the plane of movement of said spring, said member having a portion extending beyond the body spring, a pair of spring members positioned between said pivoted member and the frame one on each side of the pivot thereof, one of said springs being positioned at the extended portion thereof, and means mounted on said frame for holding the springs in place.

2. In combination with the frame and body spring of a vehicle, a shock absorber comprising a member pivoted to said body spring and positioned between said body spring and the frame in the plane of movement of said spring, said member having a portion extending beyond the body spring and away from the frame, a pair of spring members positioned between the pivoted member and the frame, one on each side of the point of pivot of said pivoted member, one of said springs being located at the extended portion of said pivoted member and means mounted on said frame for holding the springs in place.

3. In combination with the body spring and frame of a vehicle, a shock absorber comprising a pair of pivoted members positioned between said frame and body spring in the plane of movement of said body spring, said members having pairs of corresponding arms one on each side of the pivots thereof, one of said arms extending beyond the body spring and being bent away from the corresponding arm on the other member, and a pair of coil springs positioned between the extremities of said arms.

4. In combination with the frame of a vehicle, and a body spring thereof having its end relatively closely positioned to said frame, a shock absorber comprising a pair of members positioned between said spring and frame and respectively pivoted thereto, said members having extending portions projecting out beyond the body spring and diverging from each other, and other portions projecting inward from the points of pivot and relatively closer positioned than said other ends, a short spring positioned between said inner portions and a relatively longer spring positioned between said diverging portions, said springs and members being so proportioned that the maximum movement of the body spring relative to the frame will cause a great movement of the long spring and shorter movement of the shorter spring.

5. In combination with the frame and body spring of a vehicle, a shock absorber comprising a member pivoted to said body spring and positioned between said body spring and the frame in the plane of movement of said spring, said member having a portion extending within and the other portion extending beyond the body spring and bent downward and away from the frame, of a spring having one end attached to said outward portion of the pivoted member and means mounted on the frame for holding the other end of said spring and the inward projecting end of said pivoted member to the frame.

6. In combination with the body spring system of a vehicle, a shock absorber comprising two pivoted members attached to the spring system so that one end of each pivoted member extends within the spring system and the other ends extend beyond the spring system, the latter ends being diverged from one another so that a relatively long spring may be placed between them, and a relatively short spring placed between the inward projecting ends of the pivoted members, said pivoted members being in the plane of movement of said body spring and so arranged that relative movement of the vehicle body and the end of the vehicle spring will be of substantially the same extent as the relative movement of the pivots of said pivoted members.

7. In combination with the body spring of a vehicle, a shock absorber comprising two pivoted members, attached to the ends of said body spring in the plane of movement of said body spring, one portion of each member extending within the body spring and the other ends extending beyond the body spring and diverged to receive a relatively long spring, and a relatively short spring positioned between the inward projecting ends of the pivoted members.

8. In combination with the body spring of a vehicle, a shock absorber comprising a spring having a relatively long range of action and located beyond the body spring and relatively close to an end thereof, a spring having a relatively short range of action and located within the body spring at a greater distance than said first mentioned shock absorber spring from said end of the body spring, and means for mounting said shock absorber spring in the plane of movement of said body spring.

9. In combination with the body spring of a vehicle, a shock absorber comprising a member pivoted to an end of a body spring in the plane of the movement of said spring, one portion of said member extending within the body spring and the other portion extending beyond the body spring and being offset, a relatively long spring mounted on said offset portion and a relatively short spring mounted on the other portion of said member.

10. In combination with the body spring of a vehicle, a shock absorber comprising a member pivoted to an end of the body spring in the plane of movement of said spring, one portion of said member extending within the body spring and the other portion extending beyond the body spring and being offset, a relatively long spring mounted on said offset portion relatively close to said end of said body spring and a relatively short spring mounted on the other portion of said member at a greater distance than said long spring from said end of the body spring.

FRANKLIN WESLEY SPRINGER.

Witnesses:
A. G. ANDERSON,
H. W. DIXON.